US006708092B1

(12) United States Patent
Starks et al.

(10) Patent No.: US 6,708,092 B1
(45) Date of Patent: Mar. 16, 2004

(54) METHOD OF GROUPING MESSAGE IDENTIFICATION AND PARAMETER IDENTIFICATIONS FOR A DIAGNOSTIC SYSTEM

(75) Inventors: Matthew Wayne Starks, Burlington, MI (US); Balmatee Bidassie, Kalamazoo, MI (US); Steven Louis Melvin, Scotts, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/376,718

(22) Filed: Feb. 28, 2003

Related U.S. Application Data

(60) Provisional application No. 60/425,419, filed on Nov. 11, 2002.

(51) Int. Cl.[7] .......... G06F 19/00

(52) U.S. Cl. .......... 701/29; 701/33; 701/36; 340/438

(58) Field of Search .......... 701/1, 29, 30, 701/36, 31, 32, 33, 34, 35; 340/438, 439, 539, 825.69, 825.72, 10.1, 10.51; 702/57, 62, 183, 188

(56) References Cited

U.S. PATENT DOCUMENTS

| | | | |
|---|---|---|---|
| 6,225,898 B1 | 5/2001 | Kamiga et al. | 340/505 |
| 6,434,455 B1 | 8/2002 | Snow et al. | 701/33 |
| 6,529,808 B1 | 3/2003 | Diem | 701/30 |
| 6,587,756 B2 | 7/2003 | Moriguchi et al. | 701/201 |

FOREIGN PATENT DOCUMENTS

JP 7-50886 2/1995

OTHER PUBLICATIONS

Sae J1587, Surface Vehicle Recommended Practice entitled "Electronic Data Intechange Between Microcomputer Systems in Heavy–Duty Vehicle Appilcations" issued Jan. 1988, revised "proposed draft" Oct. 2001, Superseding J1587 Jul. 1998—225 pages.

*Primary Examiner*—Richard M. Camby
(74) *Attorney, Agent, or Firm*—Rader, Fishman & Grauer PLLC

(57) ABSTRACT

A method of organizing parts of a data message that conform to a protocol, thereby providing an efficient manner to specify a vehicle component that is identified by a combination of data message parts. Specifically, individual Message Identification (MID) codes are organized into categories, while Parameter Identification (PID) codes are organized according to general function. Associations can then be established between the various codes and the categories or functions into which the codes are organized.

9 Claims, 9 Drawing Sheets

| MID CATEGORIES | |
|---|---|
| 1. Dash | 11. Trailer Body |
| 2. Engine | 12. Charging/Electrical System |
| 3. Transmission | 13. Collision Avoidance Tractor |
| 4. Transmission Shifter | 14. Collision Avoidance Trailer |
| 5. Tractor Axles | 15. Aerodynamics |
| 6. Trailer Axles | 16. Communications |
| 7. Tractor Brakes | 17. Tractor Tires |
| 8. Trailer Brakes | 18. Trailer Tires |
| 9. Tractor HVAC | 19. Drivetrain Link |
| 10. Trailer HVAC | 20. All Axles |

| MID CODE | MID_DESCRIPTION | PID FUNCTIONS |
|---|---|---|
| 131 | Power Takeoff | Configuration |
| | | Performance |
| | | Pressure |
| | | Status |
| | | Temperature |
| | | Voltage/Current |

| PID FUNCTIONS | |
|---|---|
| 1. Communication | 9. Speed |
| 2. Configuration | 10. Status |
| 3. Flow | 11. Temperature |
| 4. Fluid Level | 12. Theft Info |
| 5. Load | 13. Vehicle Info |
| 6. Performance | 14. Vibration |
| 7. Position | 15. Voltage/Current |
| 8. Pressure | 16. Wear Indicators |

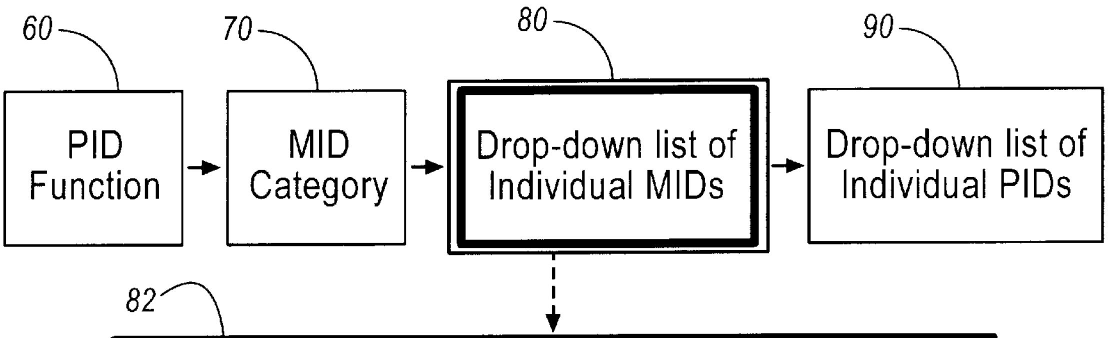

| PID FUNCTION: COMMUNICATION | |
|---|---|
| MID CATEGORY: DASH | |
| MID CODE | MID_DESCRIPTION |
| 140 | Instrument Cluster |
| 154 | Vehicle Management System |
| 162 | Diagnostic Systems, power unit |
| 171 | Driver Information Center |
| 178 | Vehicle Data Converter |
| 187 | Vehicle Control Head Unit/ Vehicle Management System #2 |
| 188 | Vehicle Logic Control Unit/ Vehicle Management System #2 |
| 189 | Vehicle Head Signs |
| 195 | Annunciator |
| 201 | Vehicle Status Points Monitor Unit |
| 213 | Vehicle Control Head Touch Screen |
| 221 | Driver Information Center #2 |
| 232 | Safety Restraint System |
| 248 | Forward Road Image Processor |

*FIG. 4C*

| COMMUNICATION | | | |
|---|---|---|---|
| MID CODE | MID_DESCRIPTION | PID CODE | PID DESCRIPTION |
| 140 | Instrument Cluster | 225 | Reserved for Text Message Acknowledged |
| | | 226 | Reserved for Text Message to Display |
| | | 227 | Reserved for Text Message Display |
| | | 448 | Page 2 Multisection Parameter |
| | | 449 | Reporting Interval Request |

METHOD OF GROUPING MESSAGE IDENTIFICATION AND PARAMETER IDENTIFICATIONS FOR A DIAGNOSTIC SYSTEM

RELATED APPLICATIONS

This application claims the benefit of U.S. Provisional Application No. 60/425,419 entitled "METHOD OF GROUPING MESSAGE IDENTIFICATION AND PARAMETETER IDENTIFICATIONS FOR A DIAGNOSTIC SYSTEM," filed Nov. 11, 2002.

FIELD OF THE INVENTION

The present invention relates generally to the field of vehicle diagnostic systems. More specifically, the invention relates to a method and system of associating parts of a vehicle area network message together to simplify the use of vehicle diagnostic equipment.

BACKGROUND OF THE INVENTION

Virtually all vehicles made today utilize components or systems that are computer controlled, ranging from the engine and transmission to the interior climate control and entertainment center. Additionally, these vehicle components or systems are often capable of exchanging data concerning their operating state across a vehicle area network (VAN) to other related systems.

With the ability to communicate data across a network, these components or systems have become easier to monitor for both performance and operating flaws. This is often accomplished by means of electronic diagnostic tools that interface with one of the vehicle data networks and retrieve information from the various components residing on that network. For example, trucks often incorporate an independent data bus for linking many of the truck's systems and components together, thereby allowing for easy and frequent monitoring of various conditions existing throughout the different systems of the truck.

In order to maintain a certain level of uniformity between the data networks of all the trucks on the road today and in the future, various organizations related to the field set forth protocols that govern not only the physical characteristics of vehicle networks, but also the format of the data that is passed along the networks. One such example, provided solely for illustrative purposes, is protocol J1708/1587 established by the Society of Automotive Engineers (SAE). Protocol J1708/1587 establishes a serial data communications link for exchanging and monitoring data being communicated between microprocessors used in heavy-duty vehicle applications. Protocol J1708 generally defines the hardware requirements of the data communications link, while protocol J1587 deals with the actual data, the format of the data and/or functions that are to be transmitted across the data link.

The communication links in trucks and other vehicles provides for the sharing of data among various components or modules that make up the vehicle. These components or modules can range from functional devices or systems incorporated into the vehicle, to extrinsic devices such as diagnostic equipment. According to one protocol, data sent along the link is grouped into packets known as "messages". According to this protocol, each message consists of three parts, with certain portions acting as an addressing or routing service that ensures that the message gets to the appropriate destination on the data link. The three parts of any message transmitted on the data link include 1) a Message Id 2) One or more Parameters and 3) Checksum.

Referring to FIG. 1, which depicts the parts of a typical data message according to an existing protocol. The first part is the Message Identification (MID) 5, which identifies the actual component or control system of the vehicle from which the data was transmitted, such as, for example, the engine, transmission, etc. No two components that are capable of transmitting data may have the same MID.

The second component of a message is a set of data characters, otherwise known as a parameter 7, which makes up the bulk of the message. The first portion of every parameter is reserved for what is known as the Parameter Identification (PID). This reserved portion is used to identify the data being sent by a MID, typically by identifying the particular subsystem or section of the control system that generated the message.

Sometimes messages do not contain PIDs, but instead possess what is known as Subsystem Identification Numbers (SIDs). Occasionally sections of a control system cannot be properly identified by one of the standardized PIDs established by the pre-defined protocol. As such, unique SIDs can be assigned by the organization or agency that established the previously defined protocol. These SIDs can be used to identify those sections of a control system that do not have a pre-defined PID. SIDs should only be assigned to field-repairable or replaceable subsystems for which failures can be detected and isolated by the control system.

After the PIDs or SIDs, the remaining data characters making up the parameter convey the meaning of the message. Included within these remaining data characters is a Failure Mode Identifier (FMI). The FMI is a specific code that describes the type of failure, if any, detected in the subsystem identified by the PID. The FMI, when combined with either the PID or SID, form a diagnostic trouble code (DTC).

The last component of the message is a checksum 9, which is a specific character generated based on the sum of the MID value and the data characters of the message. The checksum is used to verify the error-free transmission of a message across the network.

Currently, most SIDs are defined in relation to certain MIDs. Accordingly, a MID and a SID can be interpreted as a whole, thus properly identifying a component or subsystem of a control system. In contrast, the more commonly utilized PIDs are not defined in relation to most MIDs. Without some form of established relationship, any MID can be thought to correspond to any PID, even though some PIDs are made specifically for certain MIDs. This is especially problematic considering that each vehicle component on the data link, according to existing protocol, is identified by a specific combination of PID and MID values. Accordingly, in order to address one or more components for certain applications, such as diagnostic testing, the specific PID and MID combination for each component must be known. Yet without an easy way to eliminate certain MID-PID combinations, the finding of a specific component or subsystem identifier can be an insurmountable challenge due to the overwhelming number of combinations that can be readily made between MID and PID data.

It would be desirable to establish a correspondence or relationship between different parts of a message as defined by a protocol. However, the existing art does not suggest such a correspondence or relationship.

SUMMARY OF THE INVENTION

The invention is directed to a new method of organizing data that corresponds to a pre-defined protocol for a vehicle data link. The new method includes establishing message identification (MID) categories into which MID codes can be organized. Similarly, parameter identification (PID) functions are also established, which permit the organization of PID codes. Specific codes of either code type can then be associated with either certain MID categories or certain PID functions, and vice versa. This allows a specific vehicle component, which is identified by a combination of MID and PID codes, to be specified without requiring one to know the specific code combination identifying that component.

BRIEF DESCRIPTION OF THE DRAWINGS

FIGS. 4A–4D illustrate an example of how a combination of PID and MID relationships may be selected by a user according to another embodiment of the present invention.

DESCRIPTION OF THE PREFERRED EMBODIMENT

Figure 1:
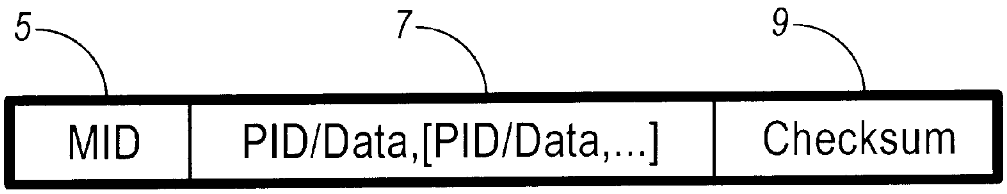
FIG. 1 is a graphical depiction of the structure of a message according to an existing protocol.
Figure 2:
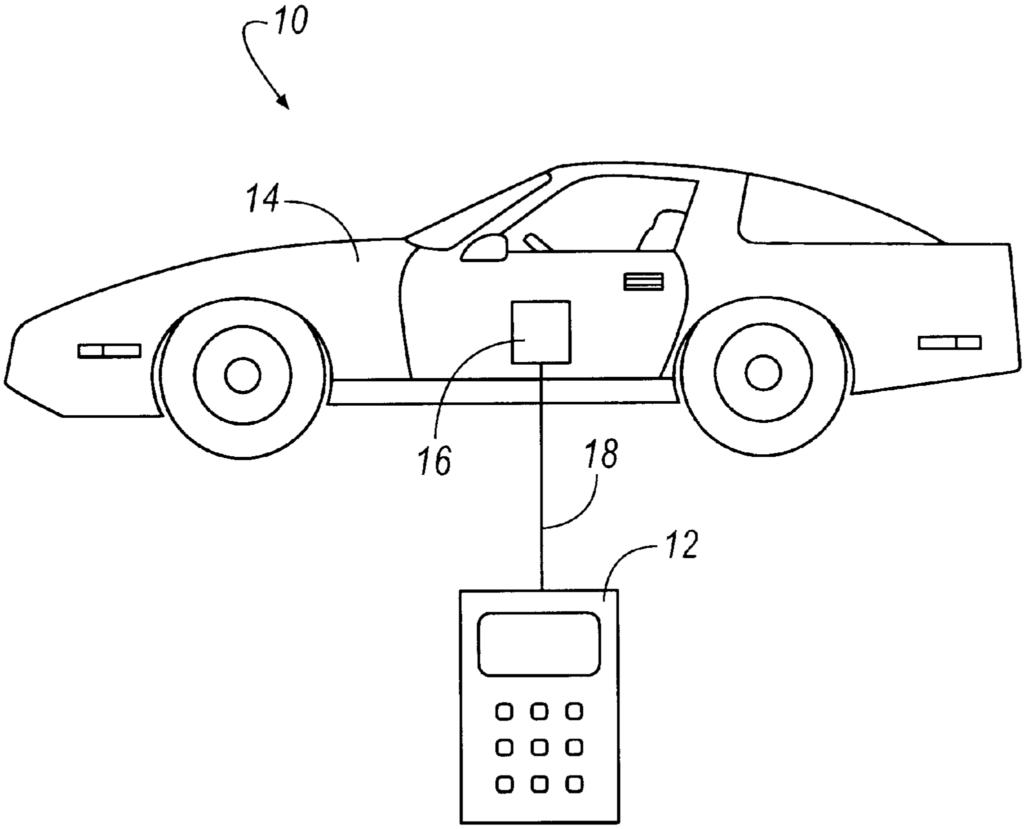
FIG. 2 is an environmental diagram illustrating one example of a basic system according to one embodiment of the present invention.

Illustrated in FIG. 2 is one example of how a system 10, in accordance with one embodiment of the present invention, might appear. Included within the system is diagnostic device 12 for monitoring one or more components 16 of a vehicle 14. Monitoring is accomplished by connecting diagnostic device 12 to the data link 18 that is incorporated in the vehicle 14. This puts the diagnostic device 12 in communication with the component 16, which is connected to data link 18. In this manner, the diagnostic device 12 can either intercept or request data from the component 16 regarding its operating state.

A significant number of Message Identification (MID) codes may exist depending on the protocol that is being followed. The protocol defines the type of data that can be transmitted along data link 18. To illustrate this point, consider the previous example dealing with protocol J1587. Currently 122 different MID codes have been assigned by the Society of Automotive Engineers (SAE) to protocol J1587.[1] For example, two such MID codes include MID code 140 assigned to the instrument cluster, and MID code 174 representing a cranking/starter system.

[1] Society Automotive Engineers J1587 Revised Proposed Draft of October, 2001.

Based upon the device or system represented, each of the MID codes established under a pre-defined protocol can be found to have a logical relationship with one or more other MID codes. Based on these logical relationships, each MID code can be assigned to one or more logical groups or categories. Thus, it may be best to assign MID code 140 (instrument cluster) to a general category representing systems that relate to the dashboard of a vehicle, while MID code 174 (cranking/starter system) may better fit category representing those systems that relate to the issues of electricity and charging.

The assignment of MID codes into categories can be achieved by various methods. For example, according to a first embodiment, the MID codes are grouped according to the vehicle system to which they belong. Alternatively, according to a second embodiment, the MID codes are grouped together based on how they logically relate to one another. Applying this method to an existing protocol, for example, protocol J1587, the MID codes are arranged into twenty groups. These twenty MID categories are listed in Table I presented below.

TABLE I

| MID Categories | |
|---|---|
| 1 | Dash |
| 2 | Engine |
| 3 | Transmission |
| 4 | Transmission Shifter |
| 5 | Tractor Axles |
| 6 | Trailer Axles |
| 7 | Tractor Brakes |
| 8 | Trailer Brakes |
| 9 | Tractor HVAC |
| 10 | Trailer HVAC |
| 11 | Trailer Body |
| 12 | Charging/Electrical System |
| 13 | Collision Avoidance Tractor |
| 14 | Collision Avoidance Trailer |
| 15 | Aerodynamics |
| 16 | Communications |
| 17 | Tractor Tires |
| 18 | Trailer Tires |
| 19 | Drivetrain Link |
| 20 | All Axles |

The MID categories presented in Table I are only one example of how the MID codes of a pre-defined protocol can be organized. Depending on the organizational relationship relied upon, numerous other examples of MID code categories can be generated and utilized to sort the numerous MID codes.

Similar to MID codes, numerous Parameter Identification (PID) codes may also exist depending on the protocol being followed. For example, 502 different PID codes are available under protocol SAE J1587.[2] Like the MID codes, PID codes can be categorized in many ways. One way of categorizing PID codes, for example, may be by a commonly shared function each generally represents. Table II, presented below, lists one example of the general categories (referred to for the remainder of the application as "function") by which PID codes can be organized.

[2] Society Automotive Engineers J1587 Revised Proposed Draft of October, 2001.

TABLE II

| PID Functions | |
|---|---|
| 1 | Communication |
| 2 | Configuration |
| 3 | Flow |
| 4 | Fluid Level |
| 5 | Load |
| 6 | Performance |
| 7 | Position |
| 8 | Pressure |
| 9 | Speed |
| 10 | Status |
| 11 | Temperature |
| 12 | Theft Information |
| 13 | Vehicle Information |
| 14 | Vibration |
| 15 | Voltage/Current |
| 16 | Wear Indicators |

As before, the PID functions presented in Table II are only one example of how PID codes can be organized. Other PID general functions or categories can be developed depending on the organizational relationship applied to the PID codes.

The organization of MID codes and PID codes into categories greatly simplifies the assignment and use of these codes by technicians and other persons who work with heavy trucks and other commercial vehicles. Consider the following example, provided for illustrative purposes, where a technician needs to perform diagnostic testing on a truck. This may involve connecting a computer-based diagnostic tool to the data link in order to monitor operational data from certain vehicle components or systems/subsystems. To accomplish this, the technician must indicate which system or subsystem he or she wants to monitor by specifying the unique combination of MID code and PID code that identifies that particular system/subsystem. However, instead of requiring the technician to specifically know and manually enter the MID code and PID code, the diagnostic tool can be setup to greatly simplify the process, allowing the technician to specify the appropriate codes by working through a hierarchy-based menu system. One example of this code selection process is depicted in FIGS. 3A–3D, which illustrate the overall steps of the selection process, along with an example of the type of data that may be illustrated by the diagnostic tool during each step.

Figure 3A:
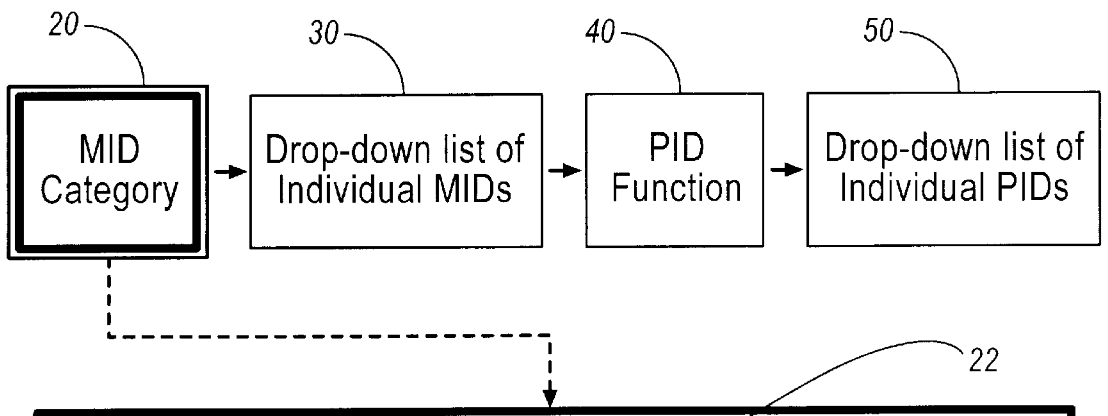
FIGS. 3A–3D illustrate an example of how a combination of MID and PID relationships may be selected by a user according to one embodiment of the present invention.
Figure 3B:
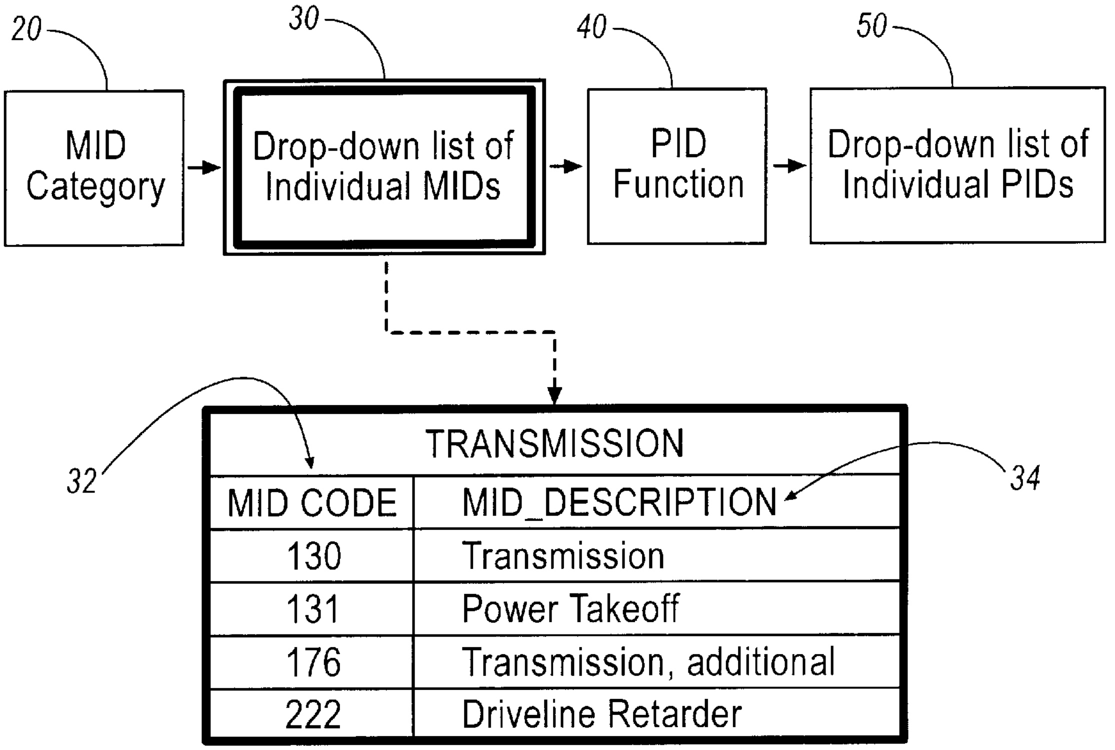

As illustrated in FIG. 3A, according to a first step 20 the technician is presented with a listing of MID categories 22 on a display device, such as, for example, a LCD display on a hand-held diagnostic tool or a computer monitor. This can be either a complete listing of MID categories, or a partial listing of categories, such as only those categories that correspond to one or more of the systems that the diagnostic tool currently detects on the data link.

Upon selecting one of the MID categories, the diagnostic tool proceeds on to the second step 30 of displaying a list of the individual MID codes 32 assigned to that category. See FIG. 3B, which illustrates an example where, upon the technician selecting MID category number three (Transmission), a listing 32 and brief description 34 appears of all the MID codes assigned to this category and currently available on the data link. According to the present embodiment, only those MID codes that represent systems currently detected and confirmed to be communicating over the data link are provided. Alternatively, an option such as a "Show All" may be provided that will cause the diagnostics to list not only the codes of systems currently communicating, but also the codes of non-communicating systems. A device in accordance with this embodiment may then be designed to selectively list just those systems currently communicating, the systems known to be present but not communicating, or all the systems. If all the systems are to be listed, the MID codes could be distinguished from one another, either graphically or by other means, to identify the MID codes representing communicating systems and the codes representing non-communicating systems.

Figure 3C:
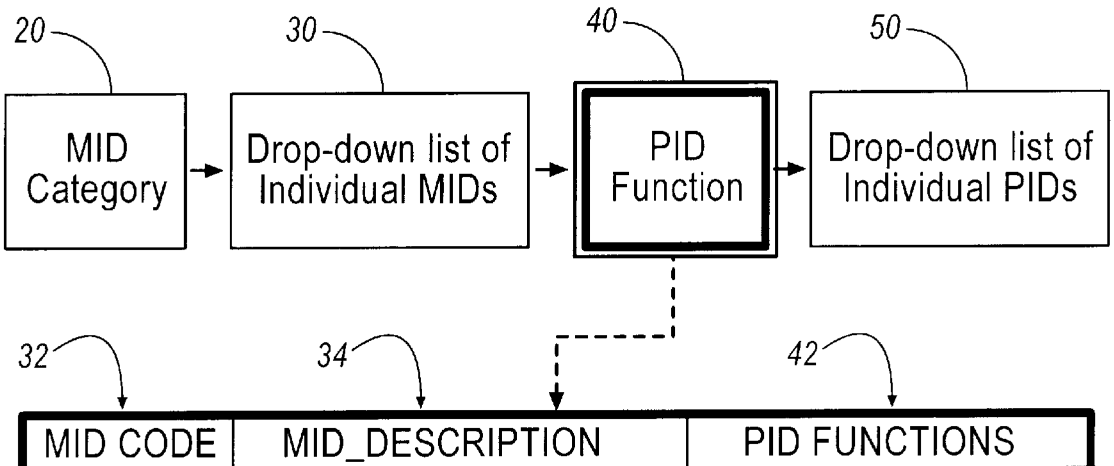

Proceeding to FIG. 3C, it is assumed for the purposes of the example that the technician selects MID code 131 (Power Takeoff). Upon making this selection, the diagnostic device initiates the third step 40 of listing all the PID functions 42 available under this MID code. Similar to the listing of MID categories, the listed PID functions can be either a complete listing, indicating all of the PID functions available under the selected MID code, or a partial listing, such as only those PID functions under the selected MID code that correspond to one or more of the subsystems that the diagnostic tool currently detects on the data link.

Figure 3D:
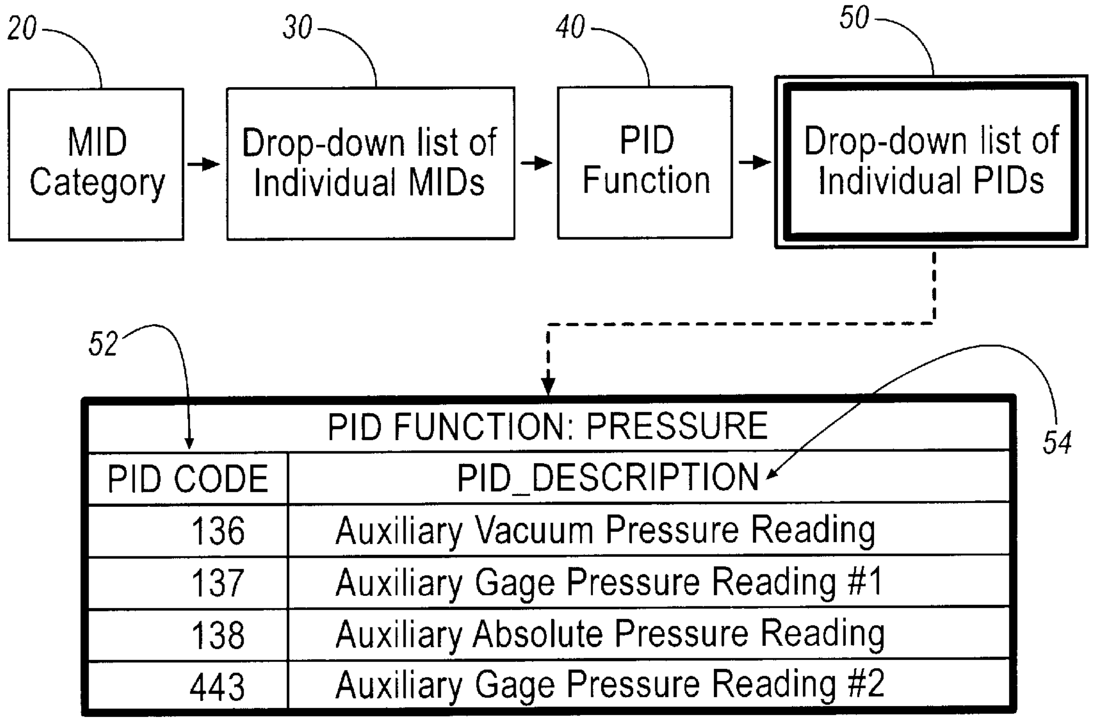

Upon selecting one of the available PID functions, a listing of the PID codes 52 that are assigned to the selected PID function is displayed. This PID code listing 52 may be a list of all available PID codes assigned to the selected PID function, or just a list of the PID codes assigned to the selected PID function that are accessible or retrievable. This step 50 is depicted in FIG. 3D, which illustrates the example where PID function "Pressure" was chosen. At this point, the technician can select one or more of the listed PID codes to perform the targeted diagnostics.

In many embodiments, if the technician feels that additional supported PID codes are available but not currently listed, an "All" option can be selected. The "All" option will proceed to show all the PID codes in a functional category.

According to the above examples, the appropriate MID-PID code combination is entered through a process that begins with the selection of a MID category. However, the present invention is not limited to this selection order, but can be configured to start with any of the categories or specific code assignments for either MID codes or PID codes. In some alternative embodiments, different types and numbers of categories may be used.

Figure 4A:
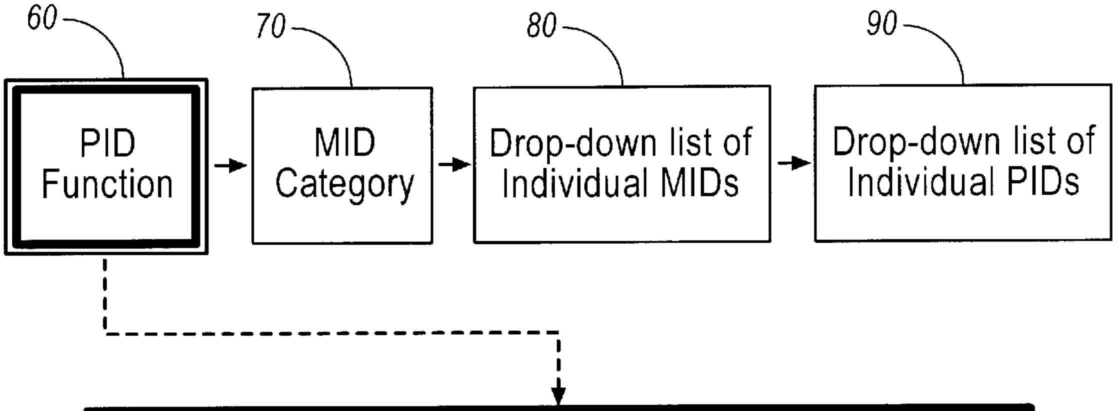

FIGS. 4A–4D illustrate an alternative embodiment for entering one or more specific MID/PID codes where the process begins with the selection of a PID function. As illustrated in FIG. 4A, the first step 60 involves the listing of PID functions available to the technician.

Figure 4B:
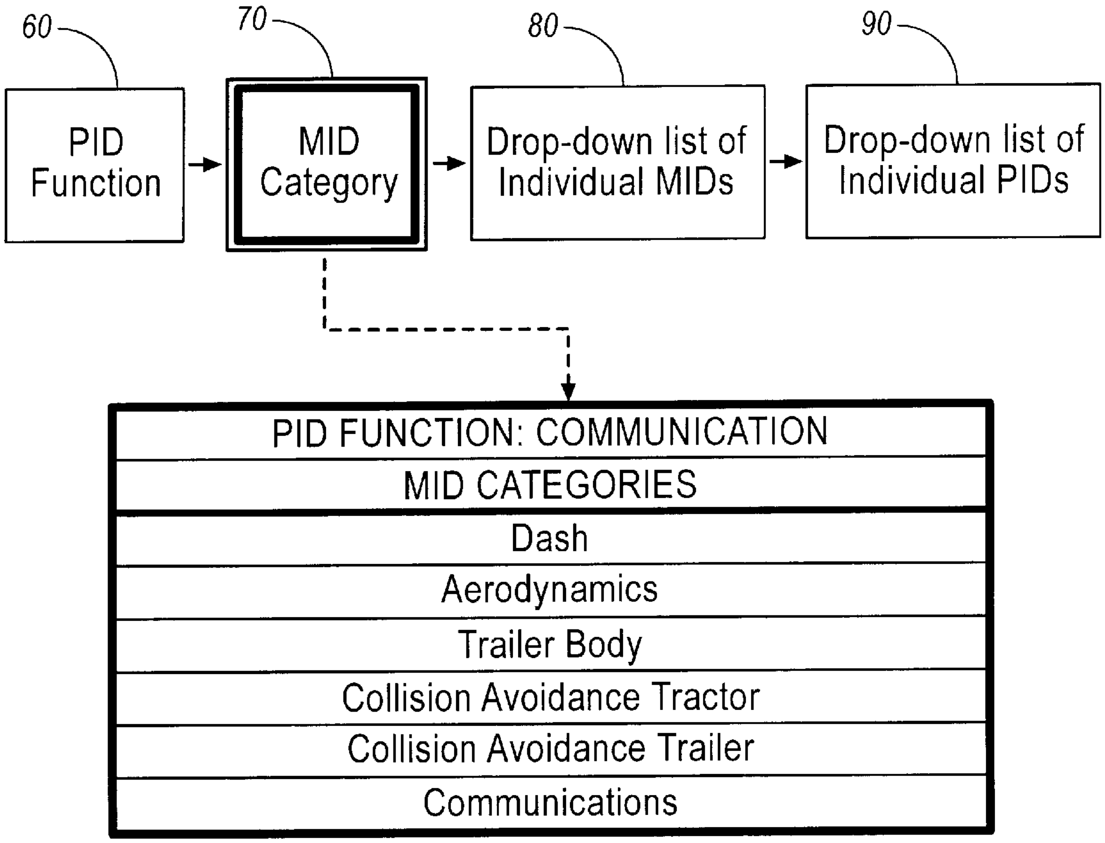

Upon selecting a PID function, the selection process proceeds to a second step 70 where a drop-down list is displayed to the technician that presents only the MID categories associated with the selected PID function. For example, as illustrated in FIG. 4B, upon selecting PID function number 1 (Communication), a listing of MID categories associated with this PID function is displayed.

According to a third step 80, once one or more MID categories are selected, a drop-down list of the related individual MID codes 82, along with a brief description 84 of the MID codes, is displayed. FIG. 4C illustrates the example where the technician selects MID category "Dash", resulting in a list of MID codes assigned to the "Dash" category to be displayed.

Figure 4D:
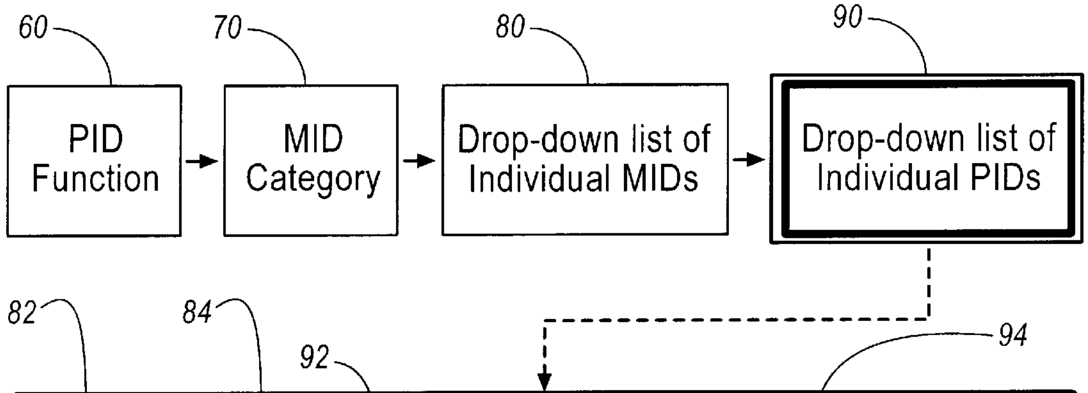

Upon selecting one or more individual MID codes, the diagnostic system proceeds on to the fourth step 90 of displaying a list of related PID codes 92 and their corresponding descriptions 94. An example of this is illustrated in FIG. 4D, where it is presumed that the technician selected MID code 140 (Instrument Cluster). Upon making this selection, a listing of PID codes 92 relating to the selected MID code is displayed. The technician can then select either an individual PID code or multiple PID codes, thereby specifying what diagnostic test or tests should be performed.

Working with pre-defined protocol data, such as during vehicle diagnostic testing, is greatly simplified through the organization of both MID codes and PID codes into a plurality of groups. This organization eliminates the need of memorizing numerous specific codes. Instead, a user can find the MID code or PID code they are looking for by simply reviewing and selecting a more readily comprehendible code group. Furthermore, by associating certain codes (MID and/or PID) with certain code groups (MID and/or PID), specific MID-PID code combinations can be readily searched and selected by a user, in a time-efficient manner. Additionally, by allowing the association of various codes with meaningful descriptions and relationships, the ability to perform automated diagnostics is enhanced and made more user-friendly.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method of organizing data defined by a protocol for a vehicle area network (VAN), comprising the steps of:

establishing a plurality of message identification (MID) categories, each of said MID categories representing a plurality of systems capable of communicating by said VAN;

assigning one or more MID codes defined by said protocol to one or more of said MID categories;

establishing parameter identification (PID) categories, each of said PID categories generally representing a logical function carried out by one or more of said plurality of systems capable of communicating by said VAN; and assigning one or more PID codes defined by said protocol to one or more of said PID categories.

2. The method according to claim 1, further comprising the step of associating each of said one or more MID codes with one or more of said PID categories.

3. The method according to claim 2, wherein each of said one or more MID codes is associated with one or more of said PID categories based on whether a system, represented by said MID code, is capable of performing said logical function represented by said one or more PID categories.

4. The method according to claim 1, further comprising the step of associating one or more of said PID categories with one or more of said MID categories.

5. The method according to claim 4, wherein each of said one or more PID categories is associated with said one or more MID categories based on whether one or more of said plurality of systems, capable of performing said logical function represented by said one or more PID categories, interacts with one or more of said plurality of systems represented by said MID categories.

6. The method according to claim 1, wherein said protocol is defined by Society of Automotive Engineers (SAE) J1587 standard.

7. A method for monitoring a vehicle device by a diagnostic tool, said vehicle device connecting to a vehicle network and capable of communicating over said vehicle network according to a protocol, comprising the steps of:

connecting said vehicle diagnostic tool to said vehicle network;

selecting a parameter identification (PID) function carried out by one or more devices making up said vehicle, said PID function representing one or more PID codes;

selecting a message identification (MID) category associated with said selected PID function, said MID category representing one or more MID codes;

selecting a MID code from said one or more MID codes represented by said selected MID category; and selecting one or more PID codes from one or more PID codes associated with said selected MID code.

8. A method of selecting a vehicle device for monitoring by a vehicle diagnostic tool, said vehicle device connecting to a vehicle network and capable of communicating over said vehicle network according to a protocol, comprising the steps of:

selecting a message identification (MID) category representing one or more MID codes;

selecting one or more MID codes represented by said selected MID category;

selecting a parameter identification (PID) function associated with said selected one or more MID codes, said PID function representing one or more PID codes; and selecting one or more PID codes from said one or more PID codes represented by said selected PID function.

9. A system for monitoring a condition of a vehicle component, comprising:

a vehicle data network upon which said component transmits data, said data including message identification (MID) codes and parameter identification (PID) codes in accordance with a protocol; and a diagnostic device capable of connecting to said vehicle data network;

wherein said system provides for the assignment of said MID codes into a plurality of MID categories, and for the assignment of said PID codes into a plurality of PID categories.

* * * * *